United States Patent
Andersen

[15] 3,669,202
[45] June 13, 1972

[54] FOUR WHEEL DRIVE VEHICLE

[72] Inventor: Adolph Leslie Andersen, Monroe, Wash. 98272

[22] Filed: Oct. 7, 1970

[21] Appl. No.: 78,851

[52] U.S. Cl. ........................... 180/50, 180/79.2 B, 280/102
[51] Int. Cl. ...................................... B62d 5/06, B60k 17/34
[58] Field of Search .................... 180/50, 79.2 B; 280/102

[56] References Cited

UNITED STATES PATENTS

| 1,123,400 | 1/1915 | Schwoob | 180/50 |
| 1,321,612 | 11/1919 | Flavin | 180/50 |
| 1,339,124 | 5/1920 | Morton | 180/50 |
| 1,371,641 | 3/1921 | Morton | 180/50 |
| 1,594,876 | 8/1926 | Clark | 280/102 |
| 3,265,146 | 8/1966 | Tucker | 180/50 X |

Primary Examiner—A. Harry Levy
Attorney—Victor J. Evans & Co.

[57] ABSTRACT

A four wheel drive vehicle in which both the front and rear wheels are driven and steered. The front and rear axle housings extend rigidly from a differential and the axles are pivoted about a central vertical pivot in an equal but opposite direction so that the rear wheels completely track the front wheels.

1 Claim, 9 Drawing Figures

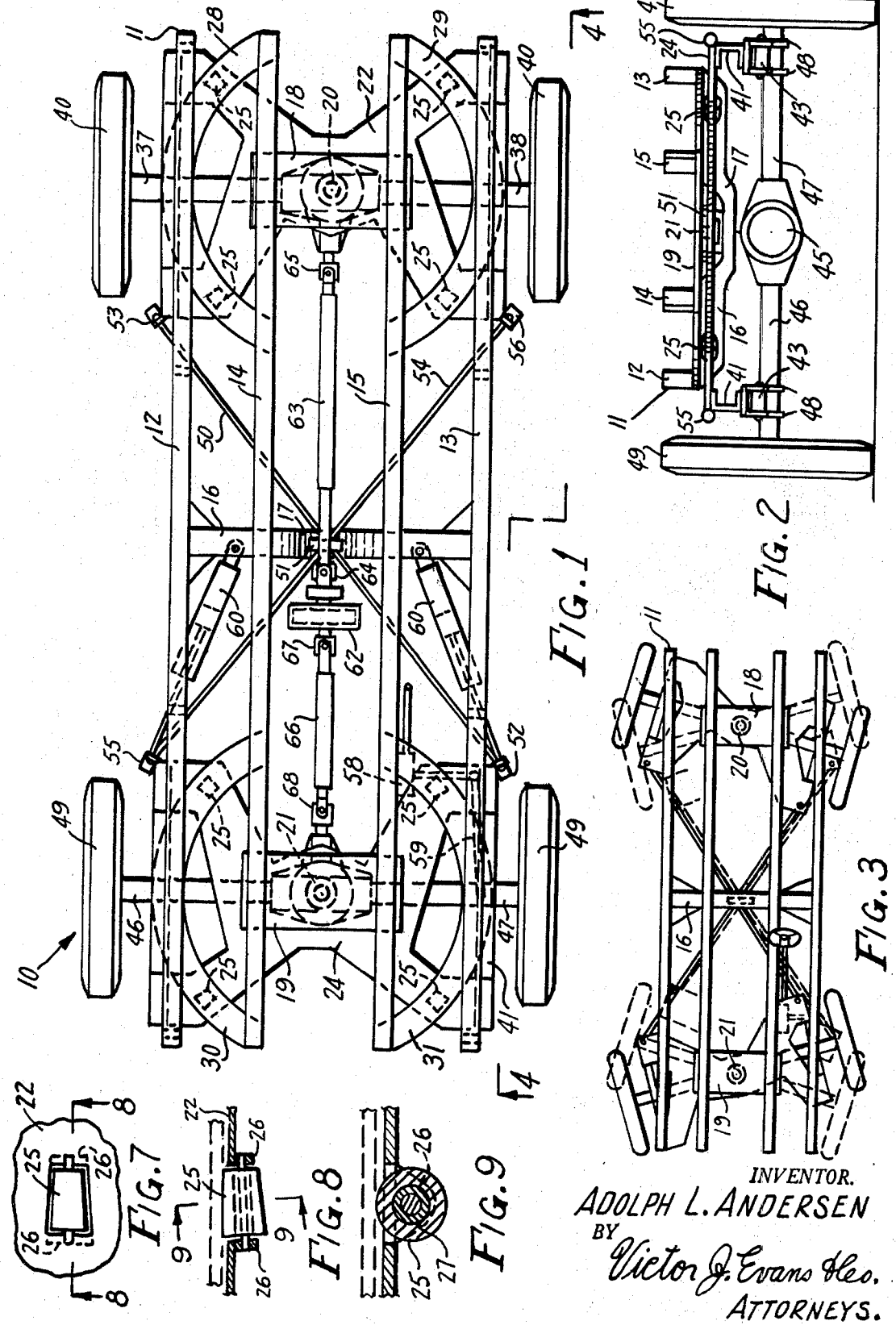

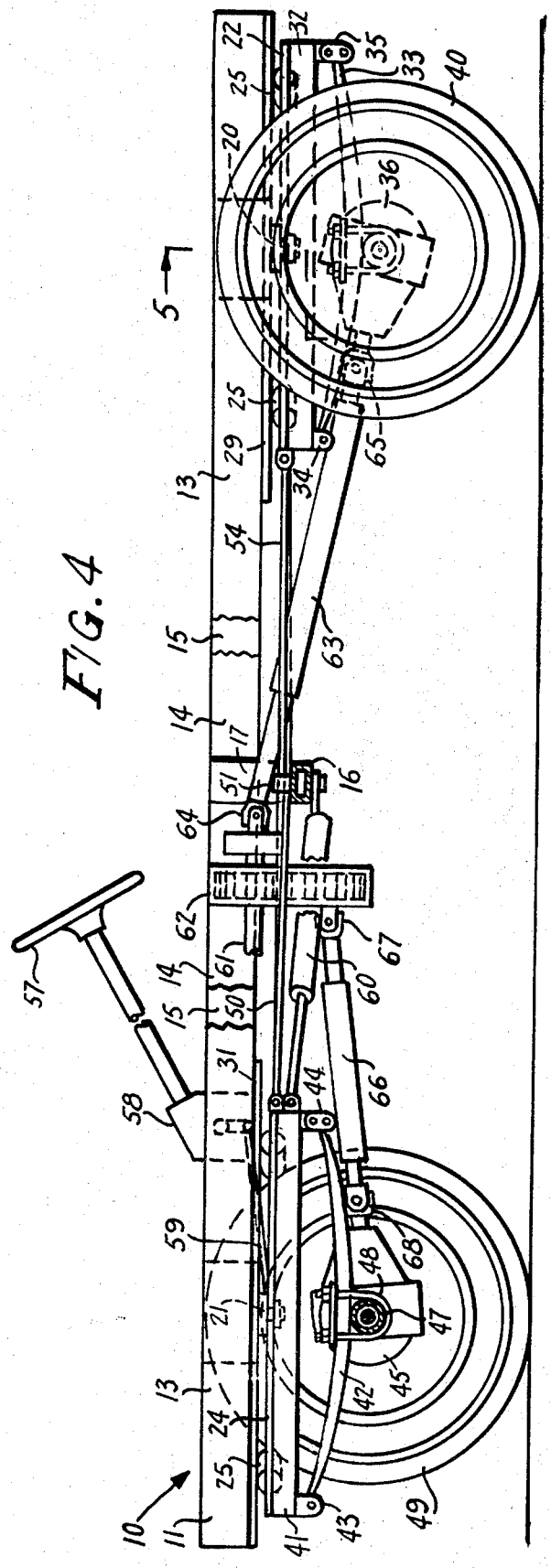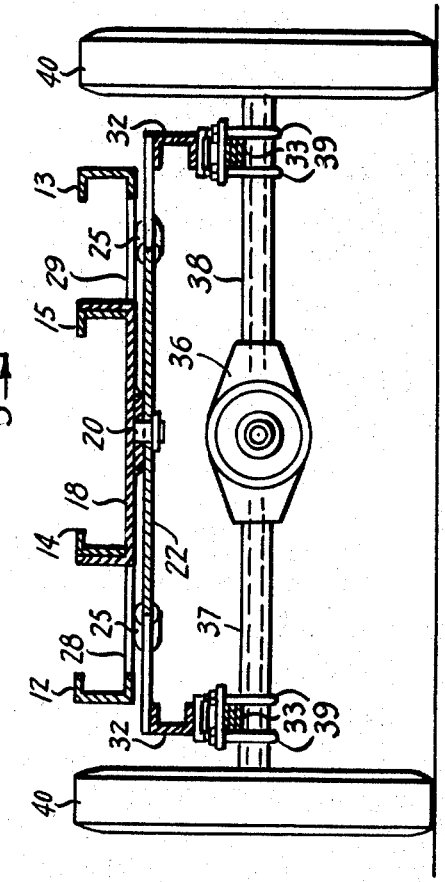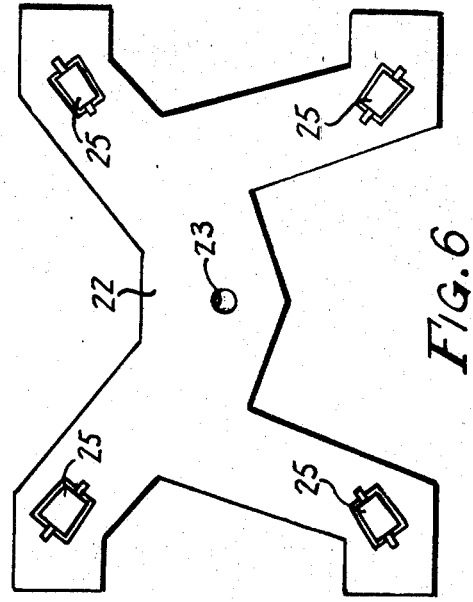

FOUR WHEEL DRIVE VEHICLE

BACKGROUND OF THE INVENTION

1. Field of the Invention

The present invention relates to four wheel drive automotive vehicles in which both the front and rear wheels are steered.

2. Description of the Prior Art

Prior art four wheel drive vehicles steer only the front wheels hence in a turn, the rear wheels trace a smaller circle then the front wheels thus traveling a lesser distance on the ground then the front wheels. The power and speed of the engine is divided equally between the front and rear wheels and due to the differences in the distances traveled in turns some skidding or sliding of the wheels to adjust to one another is required.

Conventional four wheel drive vehicles are provided with means for disengaging the front wheels to avoid the frictional loads produced by uneven travel distances. With the front wheels disengaged the vehicle is left with only the rear wheels pushing along an idle heavy front end, turning from the ground up with the differential, drive shaft and all connection up to the transfer case producing friction which reduces the power available from the engine and increases the use of gasoline.

SUMMARY OF THE INVENTION

The present invention includes front and rear differentials with each having rigid axle housings extending outwardly therefrom and supported at their outer ends by leaf springs. The leaf springs are supported from a large horizontal plate which is pivotally mounted to the center of the frame of the vehicle. The plate carries rollers which engage against a circular track to permit the plate to rotate without undo friction. The front and rear plates are inter-connected to pivot oppositely so that the rear wheels are turned to exactly track the front wheels. A drive shaft from each differential extends to the transmission of the car with each drive shaft having front and rear universal joints and a splined mounting to permit the drive shafts to lengthen slightly as the differentials are pivoted about their vertical pivots.

A simple constant mesh gear box replaces the complicated transfer case used in the prior art.

The primary object of the invention is to provide a four wheel drive four wheel steering vehicle in which the rear wheels track the front wheels during turning movements of the vehicle.

Other objects and advantages will become apparent in the following specification when considered in the light of the attached drawings.

BRIEF DESCRIPTION OF THE DRAWINGS

FIG. 1 is a top plan view of the invention;

FIG. 2 is a front elevation of the invention;

FIG. 3 is a semisymmetric illustration showing the steering of the vehicle;

FIG. 4 is an enlarged fragmentary longitudinal sectional view taken along the line 4—4 of FIG. 1, looking in the direction of the arrows, with parts broken away for convenience of illustration;

FIG. 5 is a transverse sectional view taken along the line 5—5 of FIG. 4, looking in the direction of the arrows;

FIG. 6 is a top plan view of one of the support plates;

FIG. 7 is an enlarged top plan view of one of the support plate rollers;

FIG. 8 is a vertical sectional view taken along the line 8—8 of FIG. 7, looking in the direction of the arrows; and FIG. 9 is a transverse sectional view taken along the line 9—9 of FIG. 8, looking in the direction of the arrows.

DESCRIPTION OF THE PREFERRED EMBODIMENT

Referring now to the drawings in detail wherein like reference characters indicate like parts throughout the several figures the reference numeral 10 indicates generally a four wheel drive four wheel steering vehicle constructed in accordance with the invention.

The vehicle 10 includes a frame 11 having a pair of spaced parallel outside longitudinal members 12, 13 and a pair of spaced parallel inside longitudinal members 14, 15. A transverse cross member 16 extends between and connects each of the longitudinal members 12, 13, 14, 15 and has a downwardly offset central portion 17 for reasons to be assigned. Additional cross members (not shown) may be provided in the frame 11 as desired to provide adequate strength.

A generally rectangular channel member 18 extends beneath and is secured to the longitudinal members 14, 15 adjacent the rear of the frame 11. A second generally rectangular channel member 19 extends beneath and is secured to the longitudinal members 14, 15 adjacent the front of the frame 11.

A vertically extending heavy duty pivot pin 20 is rigidly secured to the underside of the channel member 18 and extends downwardly therefrom. A vertically extending heavy duty pivot pin 21 is rigidly secured to the underside of the channel member 19 and extends downwardly therefrom.

A generally flat skeletonized plate 22 has a vertical bore 23 formed in the center thereof through which the pivot pin 20 extends. A second skeletonized plate 24 of identical construction to the skeletonized plate 22 is pivotally mounted on the pivot pin 21. The skeletonized plates 22, 24 are generally rectangular in overall outline with each of the side edges substantially cut away centrally to produce an arm extending outwardly toward each corner of the plate 22. A tapered roller 25 is journalled on a pair of ears 26 secured to the plates 22, 24 adjacent each corner thereof. The tapered rollers 25 are each supported on bronze bearings 27 as can be seen in FIGS. 7, 8 and 9. The rollers 25 extend through openings in the plates 22, 24 and are positioned so that their upper surfaces are parallel to the upper surfaces of the plates 22, 24 and projecting slightly above the plates 22, 24.

A semicircular horizontal flat raceway 28 is secured to the longitudinal members 12, 14 and a second identical raceway 29 is secured to the longitudinal members 13, 15 with the raceways 28, 29 lying in a circle having as its axis the pivot pin 20. The rollers 25 have their axes extending through the axis of the pivot pin 20 and the upper surfaces of the rollers 25 each engage the respective raceway 28, 29 to support the frame 11 from the plate 22. A raceway 30 identical to the raceway 28 is secured to the longitudinal members 12, 14 adjacent the opposite end of the frame 11 and a raceway 31 identical to the raceway 29 is secured to the longitudinal member 13, 15 in opposed relation to the raceway 30. The rollers 25 of the plate 24 engage the raceways 30, 31 respectively to support the frame 11 from the plate 24. The raceways 28, 29, 30, 31 and the channel members 18, 19 provide rigid connections between the longitudinal members 12, 13, 14, 15 and in some instances will eliminate the necessity for further cross members for the frame 11.

A longitudinally extending horizontal stringer 32 is rigidly secured to each side of the plate 22 in depending relation thereto. The stringer 32 has a length equal to that of the plate 22. A leaf spring 33 is secured to each of the stringers 32 by shackles 34, 35 as can be seen in FIG. 4.

A differential 36 is positioned beneath the frame 11 in aligned relation to the pivot pin 20. Axle housings 37, 38 are rigidly connected to the differential 36 and extend oppositely outwardly therefrom. The axle housings 37, 38 engage beneath the leaf springs 33 and are secured thereto by U-bolts 39. A rear wheel 40 is mounted on the outer end of each of the axle housings 37, 38 in a conventional manner. The plate 22, differential 36, axle housings 37, 38, stringers 32, leaf springs 33 and the rear wheels 40, as a unit, are adapted to be pivoted about the pivot pin 20 to steer the vehicle 10 in a manner to be more fully described below. The weight of the frame 11 is supported on the raceways 28, 29 and the rollers 25.

The plate 24 has a pair of longitudinally extending stringers 41 rigidly secured to the opposite side edges thereof in depending relation thereto. A leaf spring 42 is secured beneath each of the stringers 41 by shackles 43, 44. A differential 45 is mounted beneath the frame 11 in aligned relation to the pivot pin 21 at the forward end of the vehicle 10. A pair of axle housings 46, 47 are rigidly secured to the differential 45 in oppositely extending relation with the leaf springs 42 supported thereon and secured thereto by U-bolts 48. Front wheels 49 are mounted on the outer ends of the axle housings 46, 47, as can be seen in FIG. 2.

The plate 24, stringers 41, leaf springs 42, differential 45, axle housings 46, 47 and front wheels 49 are adapted to pivot, as a unit, about the pivot pin 21 to steer the vehicle in a manner to be more fully described below. The weight of the frame 11 and vehicle 10 is supported through the raceways 30, 31 on the rollers 25 journalled in the plate 24.

A steering rod 50 extends rearwardly from the left rear corner of the plate 24 to the right front corner of the plate 22 through the downwardly offset portion 17 of the cross member 16 where it is supported in a slide bearing 51. The rod 50 is connected to the plate 24 by means of a ball and socket connection 52 of conventional design having a threaded connection to the rod 50 for longitudinal adjustment. A similar conventional connector 53 connects the rear end of the rod 50 to the plate 22. A steering rod 54 extends from the right rear corner of the plate 24 rearwardly to the left front corner of the plate 22 and is supported centrally in a slide bearing 51. A conventional ball and socket connector 55 is threadedly connected to the forward end of the rod 54 to permit longitudinal adjustment of the rod 54 with respect to the plate 24. A similar connector 56 connects the rear end of the rod 54 with the plate 22. The rods 50, 54 are adjusted so that when the axle housings 46, 47 are perpendicular to the frame 11 the axle housings 37, 38 will also be perpendicular to the frame 11. As can be seen in FIG. 3 pivotal movement of the axle housings 46, 47 about the pivot pin 21 in one direction will move the axle housings 37, 38 about the pivot pin 20 in an equal and opposite direction so that the rear wheels 40 exactly track the front wheels 49 during the turning of the vehicle 10.

A steering wheel 57 is conventionally mounted to a steering gear box 58 and linkage 59 extends therefrom to the stringer 41 at the left front corner of the vehicle 10. The steering wheel 57 will cause the plate 24 to rotate about the pivot pin 21 and through the rods 50, 54 the plate 22 will be caused to rotate about the pivot pin 20. A power steering hydraulic cylinder 60 is mounted on each end of the cross member 16 and extends to opposite rear corners of the plate 24 to assist in steering the vehicle.

A relatively short drive shaft 61 extends from a motor transmission unit (not shown) rearwardly to a constant mesh gear box 62 mounted centrally in the frame 11. A drive shaft 63 is mounted by a universal joint 64 to the rear of the gear box 62 and by a universal joint 65 to the forward end of the differential 46. The drive shaft 63 is conventional in design and is longitudinally extensible to permit the pivotal action of the differential 36 about the pivot pin 20 during the turning of the vehicle 10. A drive shaft 66 is secured to the gear box 62 by universal joints 67 and to the differential 45 by a universal joint 68. The drive shaft 66 is conventional and is longitudinally extensible to permit the differential 45 to pivot about the pivot pin 21.

The differentials 36, 45 are arranged to turn oppositely through the gear box 62 so that the wheels 40, 49 are all rotated in the same direction.

Having thus described the preferred embodiment of the invention it should be understood that numerous structural modifications and adaptations may be resorted to without departing from the spirit of the invention.

What is claimed is:

1. A four wheel drive four wheel steered vehicle comprising a frame, a rigid rear axle, ground engaging wheels secured to opposite ends of said rear axle, a rear horizontal plate, means supporting said rear axle beneath said rear plate, means pivotally mounting said rear plate to said frame, said rear plate having a plurality of openings extending therethrough in circumferentially spaced relation, a tapered roller bearing means journaled in each of said openings in said rear plate supporting the weight of said frame, a rigid front axle mounted beneath the front end of said frame, a ground engaging wheel mounted on each end of said front axle, a front horizontal plate, means securing said front axle to said front plate, means pivotally securing said front plate to said frame, said front plate having a plurality of openings extending therethrough in circumferentially spaced relation, a tapered roller bearing means journaled in each of said openings in said front plate supporting said frame, a pair of cross rigid rods having their opposite ends pivotally connected to said front and rear plates interconnecting said front and rear plates to swing one of said plates equally and oppositely of the other of said plates so that said rear wheels will track said front wheels during turning movement of said vehicle, a differential supported in each of said front and rear axles, means on said vehicle for driving said differentials to drive said wheels, said means mounting said front and rear axles respectively to said front and rear plates including longitudinally extending stringers rigidly secured to each of said front and rear plates on opposite sides thereof, a leaf spring for each of said stringers having its opposite ends mounted to said stringer and secured centrally to one of said front and rear axles, said rods interconnecting said front and rear plates being longitudinally adjustable to align said rear wheels with said front wheels, and hydraulic means on said vehicle extending between said frame and one of said front and rear plates for power steering said vehicle by pivoting both of said front and rear plates simultaneously and oppositely.

* * * * *